(12) United States Patent
Vuattoux et al.

(10) Patent No.: US 10,486,576 B2
(45) Date of Patent: Nov. 26, 2019

(54) TRIM ELEMENT COMPRISING A DEPLOYABLE PART

(71) Applicant: FAURECIA INTERIEUR INDUSTRIE, Nanterre (FR)

(72) Inventors: Jean-Baptiste Vuattoux, Ermont (FR); Sandesh Patil, Pune Maharashtra (IN); Fabien Gougeon, Franconville (FR); Valentin Kent, St. Leger des Bois (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 15/965,460

(22) Filed: Apr. 27, 2018

(65) Prior Publication Data

US 2018/0312094 A1    Nov. 1, 2018

(30) Foreign Application Priority Data

Apr. 28, 2017    (FR) .................................... 17 53727

(51) Int. Cl.
| | |
|---|---|
| *B60R 7/06* | (2006.01) |
| *B60N 3/10* | (2006.01) |
| *B60R 7/04* | (2006.01) |
| *B60R 11/00* | (2006.01) |

(52) U.S. Cl.
CPC ............. *B60N 3/102* (2013.01); *B60N 3/103* (2013.01); *B60R 7/04* (2013.01); *B60R 7/06* (2013.01); *B60R 2011/0003* (2013.01); *B60R 2011/0005* (2013.01); *B60R 2011/0045* (2013.01); *B60R 2011/0075* (2013.01); *B60R 2011/0082* (2013.01); *B60R 2011/0085* (2013.01)

(58) Field of Classification Search
CPC ............ B60N 3/102; B60R 2011/0005; B60R 2011/0082; B60R 2011/0085; B60R 7/06
USPC ....................................... 224/926; 248/311.2
See application file for complete search history.

(56) References Cited

U.S. PATENT DOCUMENTS

| | | | | |
|---|---|---|---|---|
| 6,030,009 | A * | 2/2000 | Stalgren ............... | H04B 1/3877 292/24 |
| 6,619,607 | B2 * | 9/2003 | Yamada ................. | B60N 3/102 224/282 |
| 6,692,053 | B1 * | 2/2004 | Smith .................... | B60N 3/102 224/282 |

(Continued)

FOREIGN PATENT DOCUMENTS

| | | |
|---|---|---|
| FR | 3018236 A1 | 9/2015 |
| WO | WO2010103980 A1 | 9/2010 |

OTHER PUBLICATIONS

French Search Report for French appl. No. FR 1753727, dated Jan. 10, 2018, 2 pages.

*Primary Examiner* — Justin M Larson
(74) *Attorney, Agent, or Firm* — Reising Ethington P.C.

(57) ABSTRACT

A vehicle trim assembly having a support, a first fastening part fastened to the support by a fastening device that includes a first fastening element secured to the first part and a second fastening element secured to the support and a second part movable in a deployment direction relative to the first part. The fastening device has a bias element biasing the first and second fastening elements in the assembly position, the bias element being arranged such that the first and second fastening elements move toward the disassembly position when a force (F) exceeding a predetermined force is exerted in the deployment direction on the second part.

19 Claims, 5 Drawing Sheets

(56) References Cited

U.S. PATENT DOCUMENTS

| | | | | |
|---|---|---|---|---|
| 6,705,579 B2* | 3/2004 | Yamada | .................. | B60N 3/102 |
| | | | | 224/549 |
| 7,568,749 B2* | 8/2009 | Biggs | ..................... | B60N 3/102 |
| | | | | 248/311.2 |
| 8,789,867 B2* | 7/2014 | Kong | ..................... | B60N 3/102 |
| | | | | 296/24.34 |
| 9,428,118 B1* | 8/2016 | Rawlinson | .......... | B60R 11/0252 |
| 9,855,899 B2* | 1/2018 | Rode | .................. | B60R 11/0229 |
| 10,351,037 B2* | 7/2019 | Cancado | ................. | B60N 3/102 |
| 10,351,068 B2* | 7/2019 | Moran | ...................... | B60R 7/06 |
| 2002/0179660 A1* | 12/2002 | Schaal | .................... | B60N 3/083 |
| | | | | 224/282 |
| 2003/0015638 A1* | 1/2003 | Yamada | .................. | B60N 3/102 |
| | | | | 248/311.2 |
| 2003/0019993 A1* | 1/2003 | Yamada | .................. | B60N 3/102 |
| | | | | 248/311.2 |
| 2006/0071497 A1* | 4/2006 | Radu | ..................... | B60N 3/102 |
| | | | | 296/24.34 |
| 2008/0265605 A1* | 10/2008 | Biggs | ..................... | B60N 3/102 |
| | | | | 296/37.8 |
| 2013/0161977 A1* | 6/2013 | Monnier | ................... | B60R 7/06 |
| | | | | 296/187.05 |
| 2014/0339846 A1* | 11/2014 | Masuda | ................. | B60N 3/102 |
| | | | | 296/37.8 |
| 2017/0101044 A1* | 4/2017 | Jain | ........................ | B60N 3/102 |
| 2018/0312094 A1* | 11/2018 | Vuattoux | ............... | B60N 3/103 |
| 2019/0001855 A1* | 1/2019 | Jain | ........................ | B60N 3/102 |

\* cited by examiner

TRIM ELEMENT COMPRISING A DEPLOYABLE PART

TECHNICAL FIELD

The present invention relates to a vehicle trim assembly of the type comprising:
a support,
a first part fastened to the support by a fastening device, the fastening device comprising a first fastening element secured to the first part and a second fastening element secured to the support, the first fastening element and the second fastening element being movable relative to one another between an assembly position, in which the first fastening element cooperates with the second fastening element so as to fasten the first part to the support, and a disassembly position, in which the first fastening element and the second fastening element do not cooperate with one another such that the first part can be separated from the support in the disassembly position,
a second part that is movable relative to the first part between a retracted position, in which the second part extends in the first part, and a deployed position, in which the second part protrudes from the first part, the movement of the second part between the retracted position and the deployed position being done in a deployment direction.

BACKGROUND

The invention applies to any trim assembly comprising a part able to be deployed so as to offer a particular function in the deployed position. Such a function is for example a support function of an external element. Thus, the invention for example applies to a cupholder able to receive a container when it is in the deployed position. In this case, the support is for example formed by a center console or a vehicle dashboard and the first part forms a housing in which the second part, forming the cup holder, can be housed in the retracted position in order to hide the cup holder when it is not in use.

The first part is generally mounted permanently on the support using a fastening device for example formed by one or several screws or other equivalent fastening elements.

However, when an excessive force is applied on the second part in the deployed position, the connection between the first part and the second part may break. Such a force is for example applied when a user exerts too much force when inserting a container into the cup holder or during an accident or the like. In this case, one of the two parts or both parts must be replaced and the support may potentially be damaged if excessive force has been exerted on the fastening between the first part and the support.

SUMMARY

One aim of the invention is to offset these drawbacks by proposing a trim assembly that is not damaged when an excessive force is applied on the second part in the deployed position or during its deployment.

To that end, the invention relates to a trim assembly of the aforementioned type, wherein the fastening device further comprises at least one bias element biasing the first fastening element and the second fastening element in the assembly position, said bias element being arranged such that the first fastening element and the second fastening element move toward the disassembly position against the bias force of the bias element when a force exceeding a predetermined force is exerted in the deployment direction on the second part.

By providing a fastening device between the first part and the support that makes it possible to separate the first part from the support when an excessive force is exerted on the second part, one avoids any rupture or breaking of the link between the second part and the first part, and any damage to the support. Thus, instead of breaking, the assembly formed by the first part and the second part simply separates from the support if an excessive force is applied, and it is not necessary to replace all or part of the trim assembly after the incident.

According to other features of the trim assembly, considered alone or according to any technically possible combination:
the bias element is arranged between the second fastening element and the support, the bias element being compressed so as to separate the second fastening element from the first fastening element when a force exceeding a predetermined force is exerted in the deployment direction on the second part;
the bias element is formed by a spring exerting a bias force on the second fastening element so as to push it against the first fastening element in the assembly position;
the first fastening element comprises two jaws separated from each other, the second fastening element comprising two pins arranged between the jaws in the assembly position, each pin cooperating with one of said jaws in the assembly position, the pins coming closer to each other in the disassembly position;
at least one pin is translatable in a housing, the bias element extending between said moving pin and said housing;
each pin is movable in the housing, the fastening device comprising two bias elements each extending between a pin and the housing;
the second fastening element comprises an actuating surface making it possible to move the second fastening element manually between the assembly position and the disassembly position;
the actuating surface is concealed by the second part in the retracted position and is accessible when the second part is in the deployed position;
the second part is rotatable relative to the first part between the retracted position and the deployed position, the deployment direction being defined by the tangent to the arc of circle defined by the second part when it moves from the retracted position to the deployed position; and
the second part comprises a housing for receiving a container, said housing being accessible when the second part is in the deployed position.

BRIEF DESCRIPTION OF THE DRAWINGS

Other aspects and advantages of the invention will appear upon reading the following description, provided as an example, and done in reference to the appended drawings, in which.

DETAILED DESCRIPTION OF THE ILLUSTRATED EMBODIMENT

Figure 1:
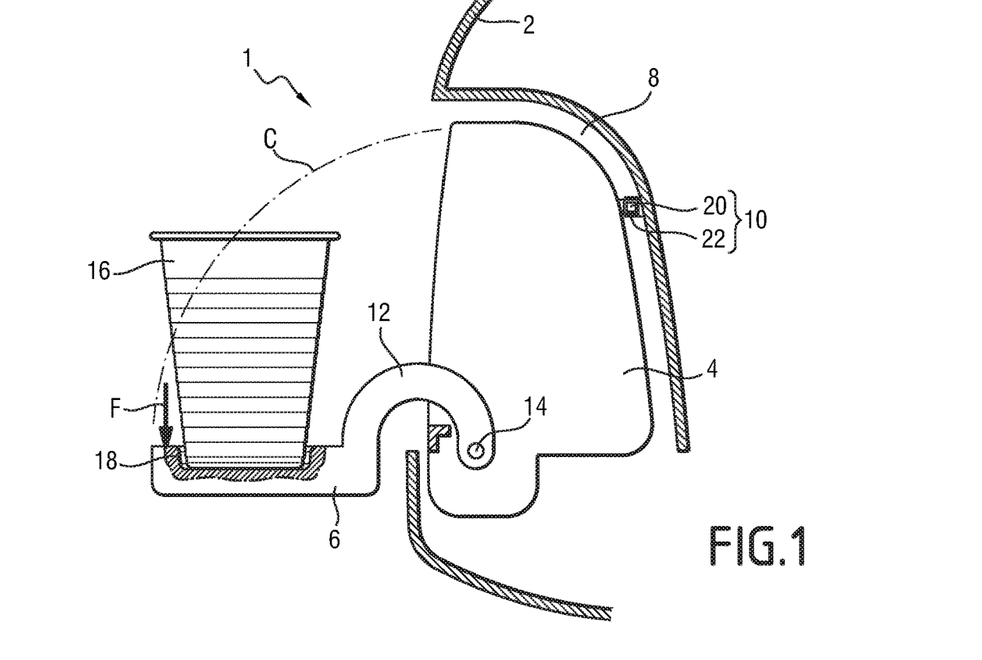
FIG. 1 is a schematic sectional illustration of a trim assembly according to one embodiment of the invention, the fastening device being in the assembly position and the second part being in the deployed position.
Figure 2:
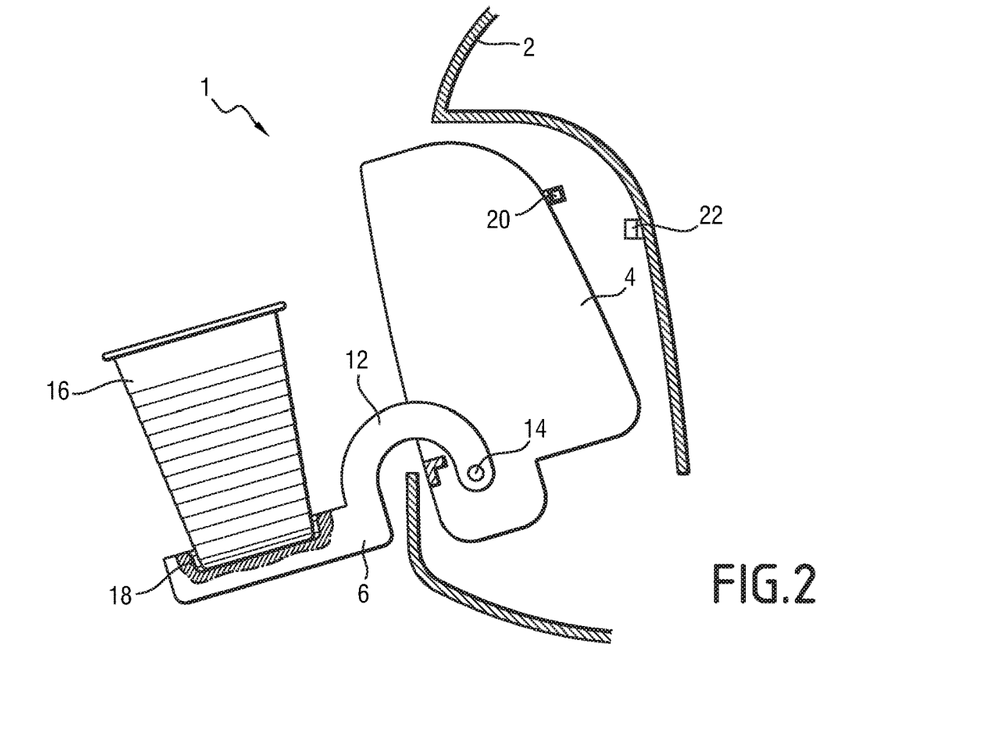
FIG. 2 is a schematic sectional illustration of the trim assembly of FIG. 1, the fastening device being in the disassembled position.

In reference to FIGS. 1 and 2, a vehicle trim assembly 1 comprising a support 2, a first part 4 and a second part 6 is described.

The support 2 is for example formed by any trim element of a vehicle, such as a center console, a dashboard, a door panel, seat trim or the like. The support 2 for example defines a receiving area 8 for the first part 4, which may for example assume a shape substantially complementary to that of the first part 4.

The first part 4 forms a housing for receiving the second part 6 and serves as assembly interface for the second part 6 on the support 2. The first part 4 is fastened to the support 2 by a fastening device 10 that will be described later.

The second part 6 is mounted movably on the first part 4 between a retracted position, in which the second part 6 is received in the housing formed by the first part 4, and a deployed position, shown in FIG. 1, in which the second part 6 extends at least partially outside the housing formed by the first part 4. According to the embodiment shown in FIGS. 1 and 2, the second part 6 rotates between the retracted position and the deployed position. To that end, the second part 6 is articulated to the first part by at least one arm 12, one end of which is mounted rotating around an axis 14. The axis 14 is for example secured to the first part 4, in which case the end of the arm 12 comprises an opening in which the axis 14 is inserted. Alternatively, the axis 14 can be secured to the arm 12 and inserted into an opening provided to that end in the first part 4. The movement of the end of the second part 6 opposite the arm 12 defines an arc of circle C between the retracted position and the deployed position. This rotational movement from the retracted position to the deployed position defines a deployment direction. Alternatively, the second part 6 could be translatable relative to the first part 4 between the retracted and deployed positions. In this case, the movement direction is defined by the translation axis along which the second part 6 moves.

The second part 6 for example forms a support for an external element that one wishes to fasten in the passenger compartment of the vehicle. As an example, and as shown in FIGS. 1 and 2, the second part 6 forms a support for receiving a container 16, for example a cup, bottle, can or the like. To that end, the second part comprises a container housing 18 that extends outside the housing formed by the first part 4 in the deployed position of the second part 6. Such a housing 18 is for example formed by an opening extending in or through the second part 6. It is, however, understood that the second part 6 could perform a function other than holding a container. Thus, the second part 6 could be a holder for a mobile device, such as a mobile telephone or the like, or comprise a screen that is visible when the second part 6 is in the deployed or other position. In all cases, the second part 6 is for example arranged so that in the retracted position, the visible surface of the second part 6 extends in the continuation of the outer surface of the support 2 in order to impart a satisfactory appearance to the trim assembly 1. The second part 6 can also be arranged so that the function performed by this part is only accessible when the second part 6 is in the deployed position.

A locking device (not shown) can be provided to keep the second part 6 in the retracted position. In this case, the passage to the deployed position by the second part 6 can only be done after unlocking this locking device.

In reference to FIGS. 3 to 6, the fastening device 10 provided between the support 2 and the first part 4 is now described.

The fastening device 10 comprises a first fastening element 20 secured to the first part 4 and a second fastening element 22 secured to the support 2.

The first fastening element 20 and the second fastening element 22 are movable relative to one another between an assembly position (FIG. 1), in which the fastening device 10 fastens the first part 4 on the support 2, and a disassembled position (FIG. 2), in which the first part 4 can be separated from the support 2.

The fastening device 10 further comprises at least one bias element 26 biasing the first fastening element 20 and the second fastening element 22 in the assembly position. In other words, the bias element 26 exerts a bias force on the first fastening element 20 or on the second fastening element 22 so as to keep the fastening elements 20 and 22 in the assembly position when no contrary force is applied on the fastening device 10. It will be noted that the bias element 26 is formed by a separate part from the first and second fastening elements 20 and 22.

The bias element 26 is arranged to allow the first fastening element 20 and the second fastening element 22 to move into the disassembled position when a force F exceeding a predetermined force is exerted in the deployment direction on the second part 6. In other words, the bias element 26 is dimensioned so that the first fastening element 20 and the second fastening element 22 move in the disassembled position against the bias force of the bias element 26 when a force F exceeding a predetermined force is exerted in the deployment direction on the second part 6. In other words, the force exerted on the second part 6 is transmitted to the first fastening element 20, which in turn exerts a force on the second fastening element, which tends to move the bias element against its bias force and allows the movement of the fastening elements into the disassembled position, as shown schematically by the arrows F and F' of FIG. 6.

In the case of a second part 6 rotatable relative to the first part 4, a force applied in the deployment direction refers to a force exerted along a tangent to the arc of circle C on the second part 6 toward its deployed position, as shown in FIG. 1. In the case of a translatable second part 6, the force applied in the deployment direction is a force exerted along the translation axis of the second part 6 toward its deployed position.

Thus, if an excessive force is exerted on the second part 6, for example if a user presses too much on the second part 6 when it is deployed or exerts an excessive force to cause the second part 6 to go from its retracted position to its deployed position, the fastening device 10 enters the disassembled position and separates the first part 4 from the support 2, as shown in FIG. 2. Such an excessive force may also be applied during an impact against the vehicle, for example during an accident. Thus, instead of damaging the articulated link between the first part 4 and the second part 6 or the support 1, such a force causes the reversible separation of the assembly formed by the first part 4 and the second part 6 from the support 2 without damaging the trim assembly. It is understood that when a force below the predetermined force is exerted in the deployment direction on the second part 6, for example when the user moves the second part 6 from the retracted position to the deployed position, the bias element 26 keeps the fastening device 10 in the assembly position. According to one embodiment, the predetermined force is substantially comprised between 100 and 150 N, for example substantially equal to 120 N.

We will now describe one particular embodiment of the fastening device 10 described above. According to this embodiment, the bias element 26 is arranged between the second fastening element 22 and the support 2 and, when a force F exceeding a predetermined force is exerted in the deployment direction on the second part 6, the first fastening element 20 exerts a force on the second fastening element 22 tending to move the second fastening element 22 so as to separate it from the first fastening element 20 against the bias force of the bias element 26, which tends to push the second fastening element 22 toward the first fastening element 20. It should be noted that according to an embodiment that will not be described here, the bias element 26 could be arranged between the first fastening element 20 and the first part 4.

Figure 3:
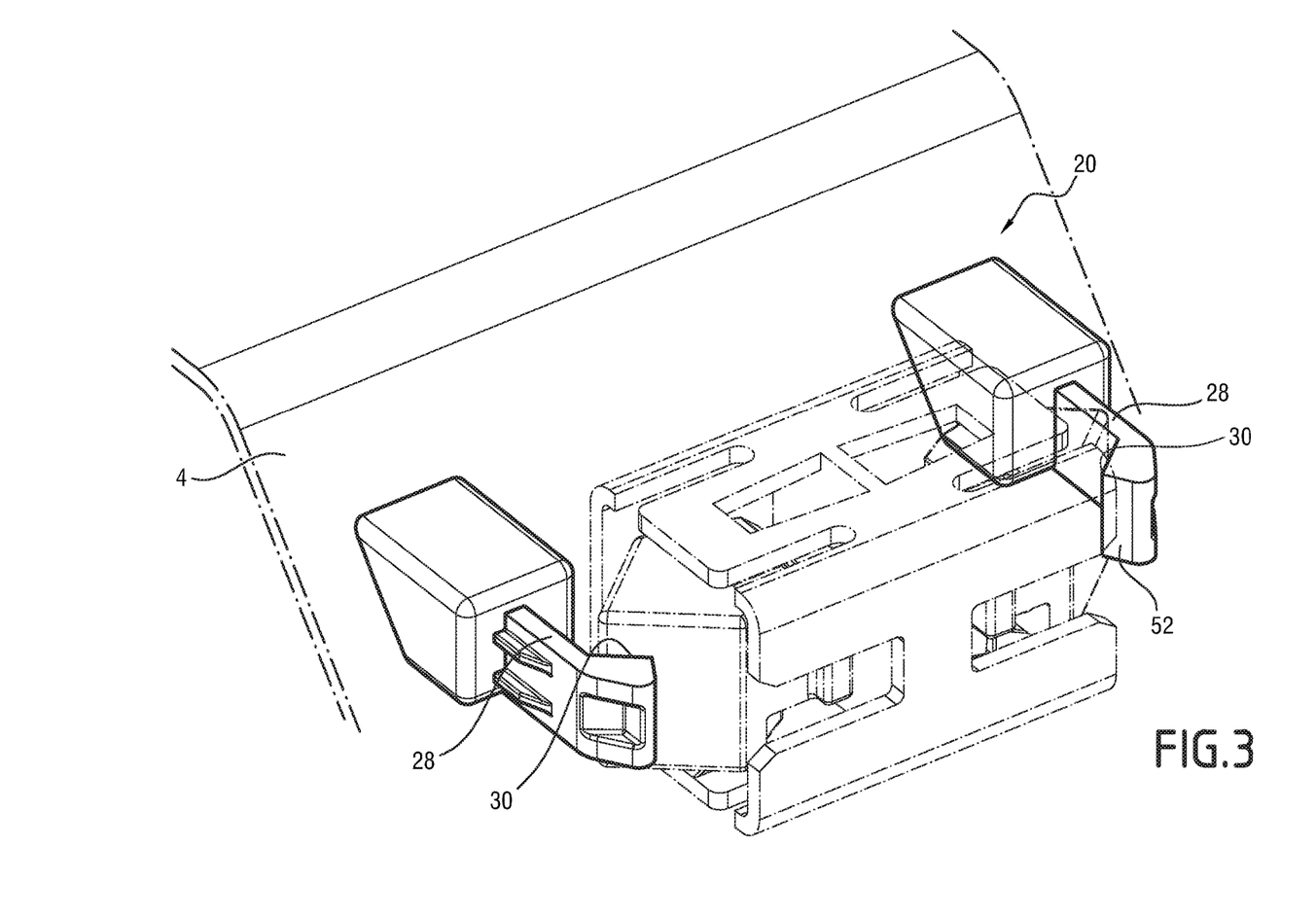
FIG. 3 is a schematic perspective illustration of the first fastening element of the fastening device.

According to the embodiment shown in FIG. 3, the first fastening element 20 is formed by two jaws 28 protruding from the first part 4 and separated from each other. Each jaw 28 comprises, at its free end opposite the end of the jaw secured to the first part 4, a cooperating surface 30 oriented toward the other jaw 28. In other words, the cooperating surfaces 30 extend across from each other and converge toward each other toward the free end of the jaws 28. The jaws 28 are for example made from Polycarbonate Acrylonitrile Butadiene Styrene (PC ABS).

Figure 4:
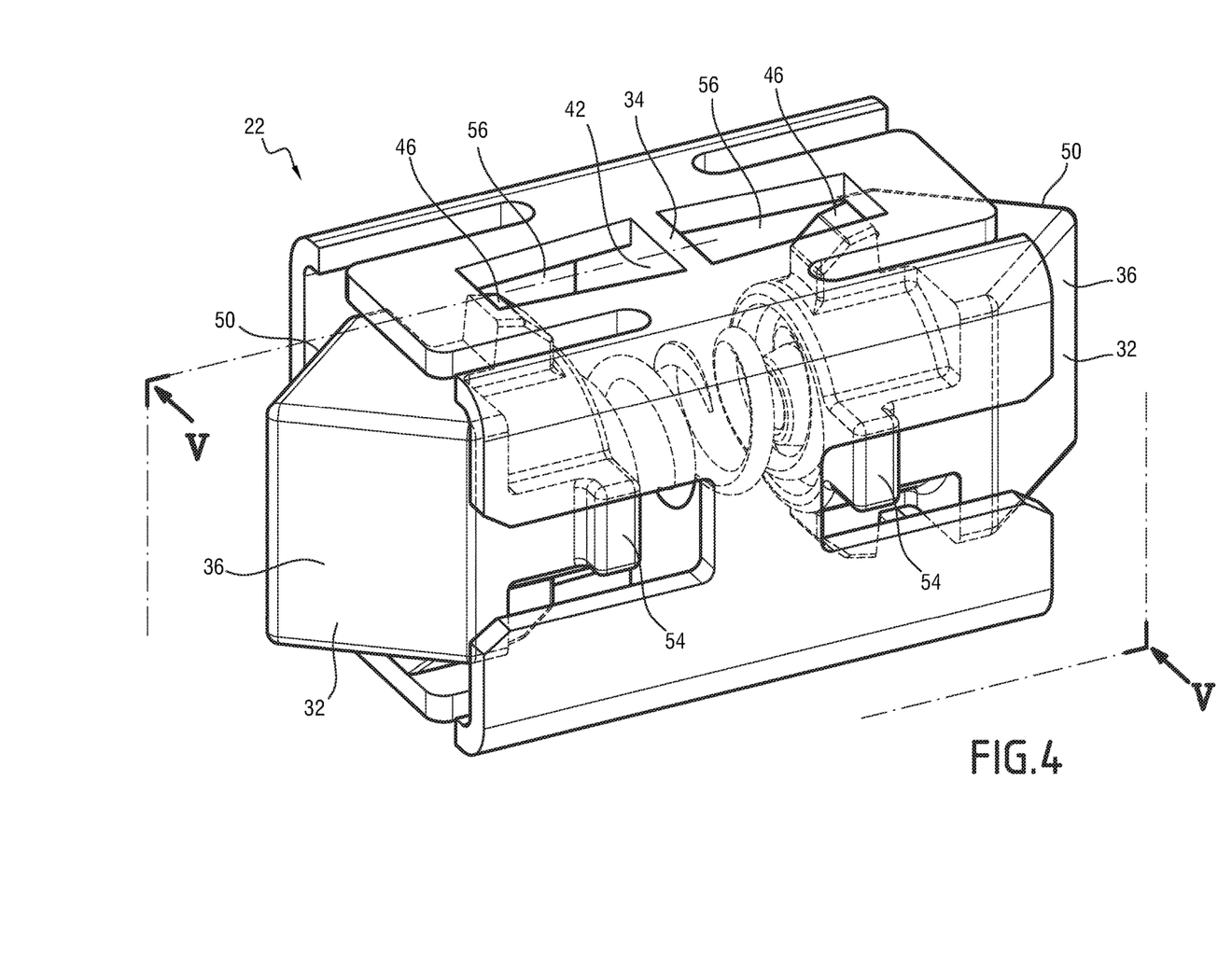
FIG. 4 is a schematic perspective illustration of the second fastening element of the fastening device.
Figure 5:
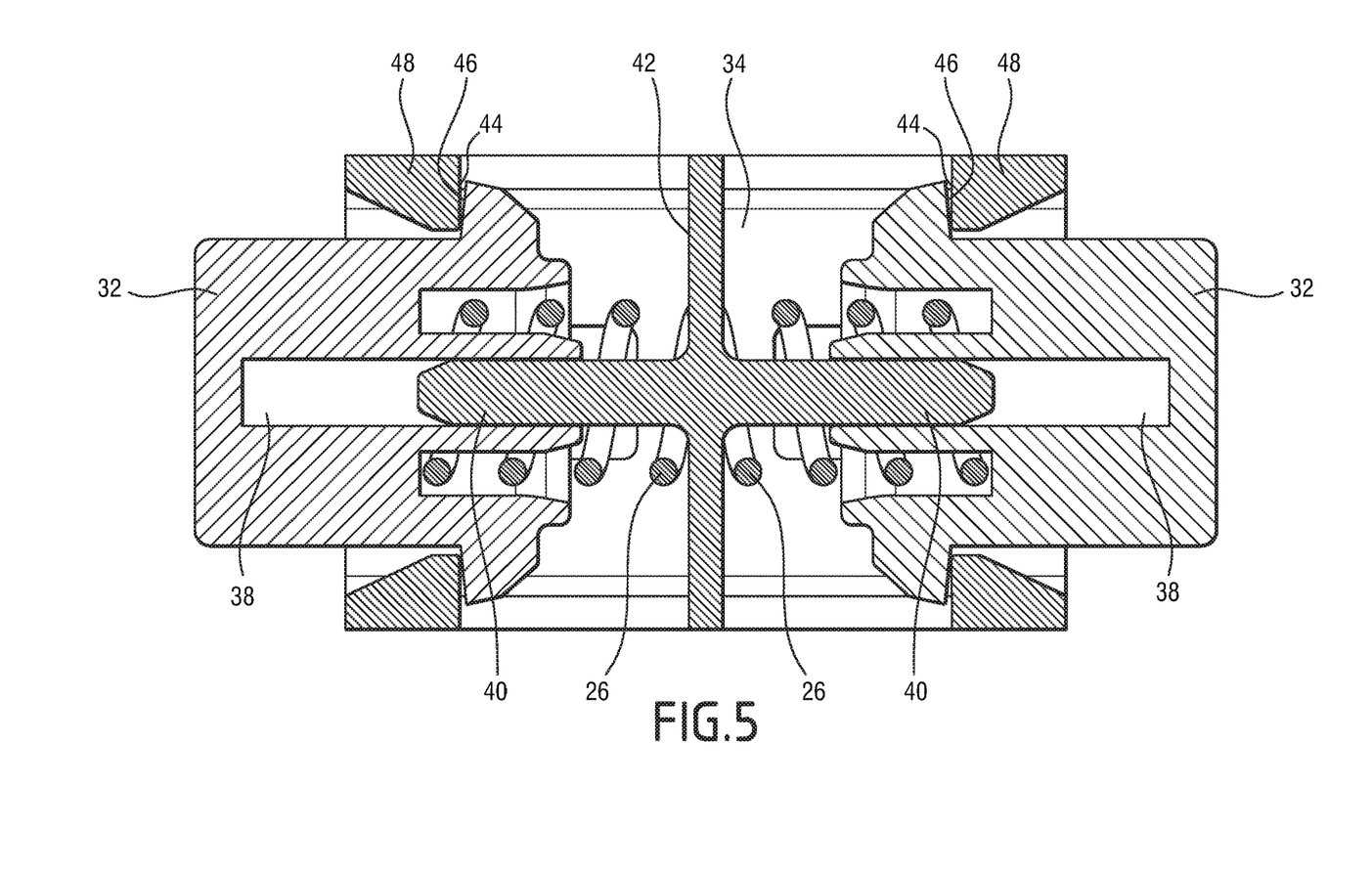
FIG. 5 is a sectional view along plane V-V of FIG. 4.
Figure 6:
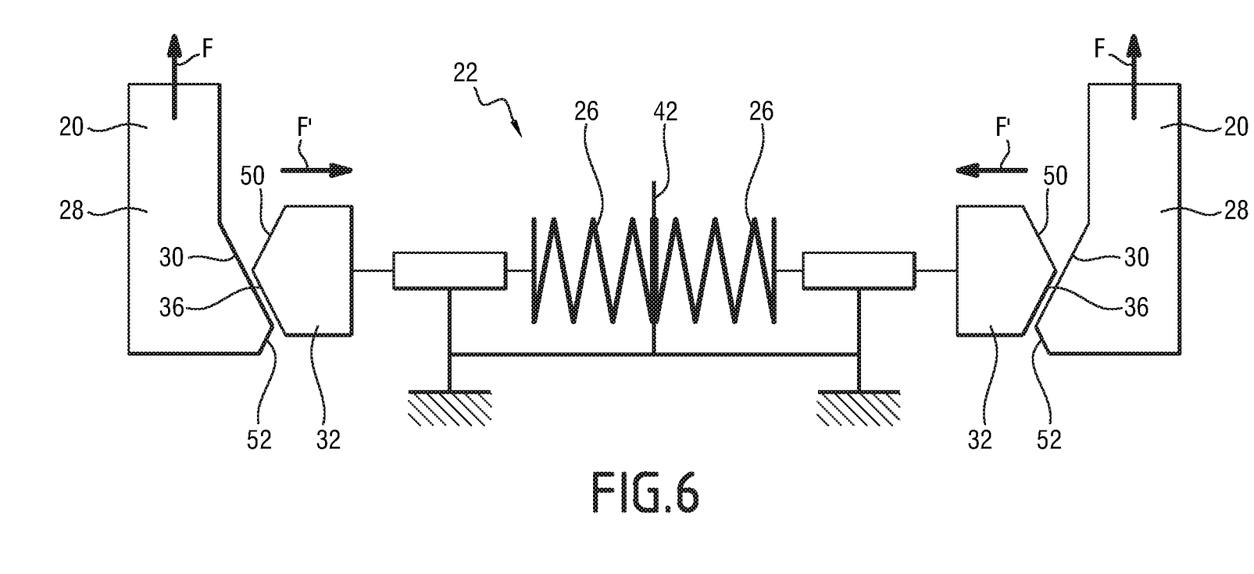
FIG. 6 is a schematic sectional illustration of part of the fastening device in the assembled position.

According to the embodiment shown in FIG. 4, the second fastening element 22 is formed by at least two pins 32 positioned between the jaws 28 and arranged in a housing 34 secured to the support 2. Each pin 32 comprises a cooperating surface 36 substantially complementary to the complementary surface of the cooperating surfaces 30 of the jaws 28. Thus, as shown in FIG. 6, in the assembly position, the cooperating surface 36 of each pin 32 is applied against the cooperating surface 30 of the jaw 28, which extends across from the pin 32 so as to fasten the first part 4 on the support 2. The cooperating surface 36 of each pin 32 protrudes from the housing 34 such that the pins 32 protrude on either side of the housing 34, as shown in FIGS. 4 and 5. The pins 32 are for example made from polyoxymethylene (POM).

At least one of the two pins 32 is mounted translatably in the housing 34 so as to be able to move relative to the jaw 28 across from which it is positioned and to allow the disengagement of the cooperating surface 36 of the pin 32 from the cooperating surface 30 of the jaw 28, and thus to place the fastening device 10 in the disassembled position. As shown in FIG. 5, the moving pin 32 for example comprises a bore 38 mounted sliding on a rod 40 extending from a central wall 42 of the housing 34 toward the jaw 28 across from which the moving pin 32 extends. According to this embodiment, the bias element 26 is a helical spring extending between the central wall 42 and the moving pin 32, for example around the rod 40. The helical spring thus exerts a bias force on the moving pin 32 pushing it toward the jaw 28. When a force contrary to the bias force of the spring is exerted on the moving pin 32, the spring is compressed and the moving pin 32 comes closer to the central wall 42 and the other pin 32 positioned on the other side of the central wall 42. The housing 32 is provided with a stop surface 44 cooperating with a complementary stop surface 46 provided on the pin 32 in order to prevent the pin 32 from leaving the housing 34 under the effect of the bias force from the bias element 26. According to one embodiment, the stop surface 44 is provided on a resilient tab 48 allowing the pin 32 to be inserted in the housing 34 during the mounting of the second fastening element 22 while separating the stop surface 44 during the insertion of the pin 32 into the housing 34.

In the case of a helical spring, for a predetermined force comprised between 100 N and 150 N, as previously indicated, the stiffness of the spring is adjusted so as to allow the spring to keep the pin 32 against the jaw 28 for a force below the predetermined force. The stiffness of the spring is also adjusted to allow the pin to move against the bias force of the spring for a force greater than the predetermined force.

According to the embodiment shown in FIGS. 4 and 5, the two pins 32 are translatable in the housing and are for example as described above. In this case, the fastening device 10 comprises two bias elements 26 bearing against the central wall 42, on either side of the latter and exerting a bias force on each of the pins 32. Thus, when a force F greater than a predetermined force is exerted in the deployment direction on the second part 6, the cooperating surfaces 30 of the jaws 28 push on the cooperating surfaces 36 of the pins 32 due to their shape and thus move the moving pins in the housing 34, the pins coming closer to each other. The cooperating surfaces 30 of the jaws 28 are thus freed from the cooperating surfaces 36 of the pins 32 and the jaws 28 can free themselves from the pins 32, the first and second fastening elements 20 and 22 then being in the disassembled position.

According to the embodiment shown in the figures, the fastening device 10 is also provided to allow the fastening of the first part 4 on the support 2 by simple pressure on the first part 4. When the jaws 28 are freed from the pins 32 and no force is exerted on them, the pins 32 are pushed toward the outside of the housing under the effect of the bias elements 26. Each pin 32 comprises a mounting surface 50 extending over the face of the pin 32 opposite the face comprising the cooperating surface 36 and for example substantially symmetrical with respect to the cooperating surface relative to a plane passing between these two surfaces. Each jaw 28 also comprises a mounting surface 52 substantially complementary to the mounting surface 50 of the pin 32. Thus, when the jaws 28 are pushed toward the pins 32, the mounting surfaces 50 and 52 come into contact and the mounting surfaces 52 of the jaws 28 push on the mounting surfaces 50 of the pins 32, which move toward the inside of the housing 34. In this way, the cooperating surfaces 30 of the jaws 28 can pass beyond the cooperating surfaces 36 of the pins 32, which next bear against the cooperating surfaces 30 of the jaws under the effect of the bias elements 26 and thus place the fastening device 10 in the assembly position.

Thus, during the first mounting of the first part 4 on the support 2 or after a disengagement of the first part 4 under the effect of an excessive force applied on the second part, simple pressure on the first part 4 toward the support 2 makes it possible to fasten the first part 4 on the support 2, which allows quick and easy mounting.

Furthermore, the second fastening element 22 can also be provided to allow manual disassembly of the first part 4 from the support 2. To that end, each pin 32 comprises an actuating surface 54, shown in FIG. 4 and making it possible to move the pin 32 toward the inside of the housing 34, for example using a tool or a user's fingers. The actuating surfaces 54 are positioned in slots 56 provided to that end in the housing 34, the slots 56 extending across from the first part 4 when the latter is fastened on the support 2. The actuating surfaces 54 are for example concealed by the second part 6 when it is in the retracted position and are only accessible when the second part 6 is in the deployed position.

The first fastening element 20 has been described as comprising two jaws 28 and the second fastening element 22 has been described as comprising two pins 32. It is, however, understood that the fastening device 10 could work with a single jaw 28 and a single pin 32 by adapting the shape of these elements accordingly. The first part 4 has been described as forming a housing receiving the second part 6 in the retracted position. It is, however, understood that the first part 4 could have any shape and that the second part 6 could simply be folded down against the first part in the retracted position.

The trim assembly 1 described above can therefore be assembled and disassembled easily. It will in particular be noted that the force necessary to assemble the first part 4 on the support 2 is lower than the force necessary to disassemble the first part 4 from the support 2. The assembly and disassembly forces can be adjusted by modifying the stiffness of the bias elements and/or the slope of the cooperating surfaces 36 of the pins 32. Furthermore, the first part 4 can be disassembled from inside the vehicle, i.e., by passing through the visible face of the trim assembly. Furthermore, if excessive force is applied on the second part 6, the trim assembly provides reversible separation of the first part 4 from the support 2 without damaging the trim assembly 1.

The invention claimed is:

1. A vehicle trim assembly comprising:
   a support,
   a first part fastened to the support by a fastening device, the fastening device comprising a first fastening element secured to the first part and a second fastening element secured to the support, the first fastening element and the second fastening element being movable relative to one another between an assembly position, in which the first fastening element cooperates with the second fastening element so as to fasten the first part to the support, and a disassembly position, in which the first fastening element and the second fastening element do not cooperate with one another such that the first part can be separated from the support in the disassembly position,
   a second part that is movable relative to the first part between a retracted position, in which the second part extends in the first part, and a deployed position, in which the second part protrudes from the first part, the movement of the second part between the retracted position and the deployed position being done in a deployment direction,
   wherein the fastening device further comprises at least one bias element biasing the first fastening element and the second fastening element in the assembly position, said bias element being arranged such that the first fastening element and the second fastening element move toward the disassembly position against the bias force of the bias element when a force exceeding a predetermined force is exerted in the deployment direction on the second part, and
   wherein the bias element is arranged between the second fastening element and the support.

2. The trim assembly according to claim 1, wherein the bias element is compressed so as to separate the second fastening element from the first fastening element when a force exceeding a predetermined force is exerted in the deployment direction on the second part.

3. The trim assembly according to claim 1, wherein the bias element is formed by a spring exerting a bias force on the second fastening element so as to push it against the first fastening element in the assembly position.

4. The trim assembly according to claim 1, wherein the second part is rotatable relative to the first part between the retracted position and the deployed position, the deployment direction being defined by the tangent to the arc of circle defined by the second part when it moves from the retracted position to the deployed position.

5. The trim assembly according to claim 1, wherein the second part comprises a housing for receiving a container, said housing being accessible when the second part is in the deployed position.

6. The trim element according to claim 1, wherein the first fastening element comprises two jaws separated from each other, the second fastening element comprising two pins arranged between the jaws in the assembly position, each pin cooperating with one of said jaws in the assembly position, the pins coming closer to each other in the disassembly position.

7. The trim assembly according to claim 6, wherein at least one pin is translatable in a housing, the bias element extending between said moving pin and said housing.

8. The trim assembly according to claim 7, wherein each pin is movable in the housing, the fastening device comprising two bias elements each extending between a pin and the housing.

9. The trim assembly according to claim 1, wherein the second fastening element comprises an actuating surface making it possible to move the second fastening element manually between the assembly position and the disassembly position.

10. The trim assembly according to claim 9, wherein the actuating surface is concealed by the second part in the retracted position and is accessible when the second part is in the deployed position.

11. A vehicle trim assembly comprising:
    a support,
    a first part fastened to the support by a fastening device, the fastening device comprising a first fastening element secured to the first part and a second fastening element secured to the support, the first fastening element and the second fastening element being movable relative to one another between an assembly position, in which the first fastening element cooperates with the second fastening element so as to fasten the first part to the support, and a disassembly position, in which the first fastening element and the second fastening element do not cooperate with one another such that the first part can be separated from the support in the disassembly position,
    a second part that is movable relative to the first part between a retracted position, in which the second part extends in the first part, and a deployed position, in which the second part protrudes from the first part, the movement of the second part between the retracted position and the deployed position being done in a deployment direction,
    wherein the fastening device further comprises at least one bias element biasing the first fastening element and the second fastening element in the assembly position, said bias element being arranged such that the first fastening element and the second fastening element move toward the disassembly position against the bias force of the bias element when a force exceeding a predetermined force is exerted in the deployment direction on the second part, and wherein the bias element is formed by a spring exerting a bias force on the second fastening element so as to push it against the first fastening element in the assembly position.

12. The trim assembly according to claim 11, wherein the bias element is arranged between the second fastening element and the support, the bias element being compressed so as to separate the second fastening element from the first fastening element when a force exceeding a predetermined force is exerted in the deployment direction on the second part.

13. The trim assembly according to claim 11, wherein the second part is rotatable relative to the first part between the retracted position and the deployed position, the deployment direction being defined by the tangent to the arc of circle defined by the second part when it moves from the retracted position to the deployed position.

14. The trim assembly according to claim 11, wherein the second part comprises a housing for receiving a container, said housing being accessible when the second part is in the deployed position.

15. The trim element according to claim 11, wherein the first fastening element comprises two jaws separated from each other, the second fastening element comprising two pins arranged between the jaws in the assembly position, each pin cooperating with one of said jaws in the assembly position, the pins coming closer to each other in the disassembly position.

16. The trim assembly according to claim 15, wherein at least one pin is translatable in a housing, the bias element extending between said moving pin and said housing.

17. The trim assembly according to claim 16, wherein each pin is movable in the housing, the fastening device comprising two bias elements each extending between a pin and the housing.

18. The trim assembly according to claim 11, wherein the second fastening element comprises an actuating surface making it possible to move the second fastening element manually between the assembly position and the disassembly position.

19. The trim assembly according to claim 18, wherein the actuating surface is concealed by the second part in the retracted position and is accessible when the second part is in the deployed position.

* * * * *